April 25, 1950        P. H. RYAN        2,505,145
VALVE
Filed June 13, 1946
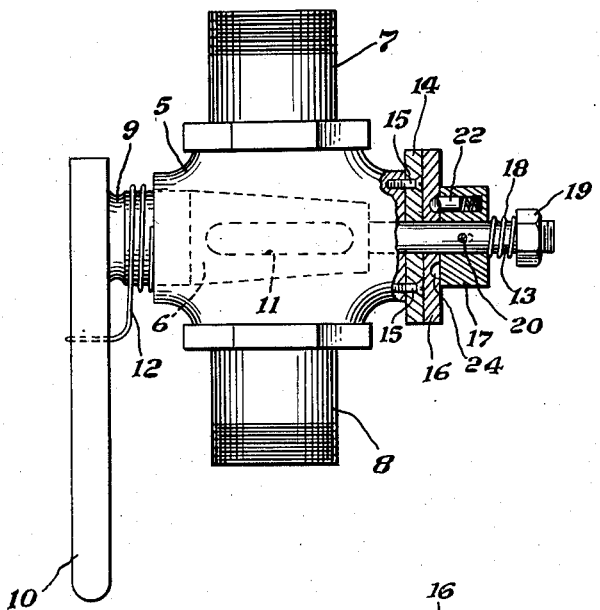
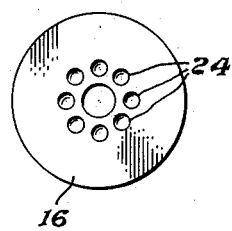
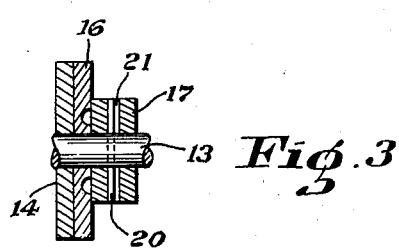
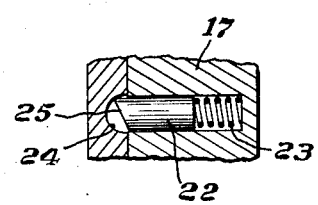
INVENTOR.
Perley H. Ryan
BY
Spear+Spear
ATTORNEYS Patented Apr. 25, 1950

2,505,145

UNITED STATES PATENT OFFICE 2,505,145

VALVE

Perley H. Ryan, Brookline, Mass.

Application June 13, 1946, Serial No. 676,495

6 Claims. (Cl. 251—149)

My present invention relates to self-closing valves and particularly to a brake means to retard their closing.

Self-closing valves are commonly employed and are satisfactory in operation except for the common objectionable feature that the valves do not remain open for a sufficient length of time to permit a sufficient discharge through the conduits which they control.

In accordance with my invention, I provide a valve casing having a chamber and inlet and outlet ports in communication therewith. Within the chamber, I mount a valve plug for movement from a closed position blocking the ports from each other into an open position effecting communication therebetween. Connected to one end of the plug is suitable means for moving it into its open position and including a spring yieldably urging it into its closed position. I connect brake means to the other end of the plug and to the casing to retard the closing of the valve as desired.

While my brake means may be a pair of friction surfaces suitably maintained in engagement or spring-pressed detent means engaging in a series of recesses as the valve rotates into its closed position, I prefer a combination of such in order to provide adequate braking action as the valve closes without interference with its movement into its open position.

In order to accomplish this result, I provide the plug with a stem extending outwardly from the casing and on this I loosely mount a disc, one face of which frictionally engages a like surface on the casing. Slidably secured to the stem is a member having one end in engagement with the other face of the disc and interposed between its other end and the end of the stem is a spring which seats the member against the disc and maintains the friction surfaces of the disc and the casing suitably in engagement. A spring-pressed latch in the member is disposed to enter any one of a series of pockets in the disc and is so shaped that it does not lock therein when the plug is turned into its open position, but positively locks in one of them when the plug is turned towards its closed position.

By this construction, I am able to provide adequate locking action to retard the closing of the valve as desired. At the same time, the engaged braking surfaces do not affect the ease with which the valve is opened because the latch does not then connect the member thereto.

In the accompanying drawing, I have shown an illustrative embodiment of my invention from which its novel features and advantages will be readily apparent.

In the drawings:

Fig. 1 is a side view of a valve in accordance with my invention partly sectioned to show the brake means by which the closing of the valve is retarded.

Fig. 2 is a face view of the disc having the pockets in one of which the latch locks to render the brake means operative as the valve closes.

Fig. 3 is a fragmentary section showing the connection of the latch carrying member to the stem, and Fig. 4 is a fragmentary view on an enlarged scale showing the shape of the latch by which the brake means are connected to the stem only when the valve is moved towards its closed position.

While my invention is adapted for use in any self-closing valve, I have indicated at 5 a valve casing having a tapered chamber in which is seated the rotatable valve plug 6. The casing 5 has inlet and outlet ports in communication with the chamber and to these are threaded, respectively, the fittings 7 and 8.

The plug 6 has a stem 9 extending through one side of the casing 5 and as indicative of valve opening means I have shown a handle 10 fast on the stem 9 by which the valve plug 6 may be turned into its open position in which the passage 11 is disposed to effect communication between the inlet and outlet ports. The valve plug 6 is yieldably urged into its closed position in which it blocks the flow between the ports by means of a spring 12 shown as anchored to the handle 10 and the casing 5 and coiled about the stem 9.

At its other or smaller end, the plug 6 has a stem 13 extending through the other side of the casing 5 which has one of the brake surfaces. For convenience, I have shown this as a disc 14 secured to the casing 5 as by screws 15. I mount a second disc 16 on the stem 13 so that it may be freely slid or turned independently thereof. The disc 16 establishes the other brake surface and it is seated against the brake surface of the disc 14 by the member 17 under the influence of the spring 18 adjustably tensioned by the nut 19 threaded on the stem 13. The spring 18 also serves to tightly seat the plug 6 in its tapered chamber. The discs may be made of any suitable stock or they may have secured to them facings of suitable friction material, but preferably they are of relatively large size to ensure suitable braking effect.

The member 17 is slidably secured to the stem 13 by means of a pin 20 extending through the stem 13 and the transverse slot 21 through the member 17. (See Fig. 3.) The member 17 has a pocket slidably receiving the latch 22 which is pressed against the adjacent face of the disc 16 by a spring 23. Said adjacent face is formed with a series of recesses 24 disposed to be engaged and entered by the latch 22 as the plug 6 is turned. As may be most clearly seen in Fig. 4, the recess entering end of the latch 22 is beveled as at 25 so that when the plug 6 is turned towards its open position, the latch 22 does not lock in the recesses. When, however, the plug 6 is turned towards its closed position, the latch 22 positively locks in the first of the recesses 24 which it enters, thereby locking the second disc 16 to the member 17 so that the turning of the plug 6 under the influence of the spring 12 is opposed by the frictional resistance of the engaged faces of the discs 14 and 16.

My brake means does not materially increase resistance to the opening of the valve. While the faces of the disc 16 and the member 17 that are in mutual engagement may be finished to minimize friction, the end of the member 17 that engages the disc 16 is of such relatively small area that any appreciable drag when the valve is opened is avoided.

While my invention is well adapted for use in a wide variety of valve structures, the brake means which I have shown and described is simple in construction and reliable in operation and has the advantage that the means retarding the closing of the valve may be exposed outside the casing for convenience in assembly and service.

What I therefore claim and desire to secure by Letters Patent is:

1. A self-closing valve comprising a casing having a passage therethrough and a tapered chamber interconnecting said passage and dividing it into inlet and outlet ports, a tapered valve plug rotatably mounted in said chamber for movement between a closed position blocking said ports from each other into an open position effecting communication therebetween, means connected to one end of said plug by which it may be turned into its open position and including a spring anchored to said casing and yieldably urging said plug into its closed position, a stem on the other end of said plug extending outwardly from said casing, said casing having a brake surface, a member rotatable with said stem and having a brake surface, and spring means interposed between said member and the end of said stem urging said brake surfaces into engagement and seating said plug in said chamber.

2. A self-closing valve comprising a casing having a passage therethrough and a chamber intersecting said passage and dividing it into inlet and outlet ports, a valve element rotatably mounted in said chamber for movement between a closed position blocking said ports from each other into an open position effecting communication therebetween, means connected to one end of said valve element by which it may be turned into its open position and including a spring anchored to said casing and yieldably urging said plug into its closed position, a stem on the other end of said valve element extending outwardly from said casing, said casing having a friction surface, means rotatable with said stem including a member having a friction surface, and a spring interposed between said last named means and the end of said stem urging said brake surfaces into engagement.

3. The valve of claim 2 in which the casing has a disc attached thereto establishing the casing brake surface and the brake surface of the member is of substantially the same size and shape.

4. A self-closing valve comprising a casing having a passage therethrough and a chamber intersecting said passage and dividing it into inlet and outlet ports, a valve element rotatably seated in said chamber for movement between a closed position blocking said ports from each other into an open position effecting communication therebetween, means connected to one end of said valve element by which it may be turned into its open position and including a spring anchored to said casing and yieldably urging said valve element into its closed position, a stem on the other end of said valve element extending outwardly from said casing, said casing having a friction surface surrounding said stem, a disc slidable on said stem and having a friction surface disposed to engage with the friction surface on said casing, a member slidably connected to said stem, means effecting a positive connection between said member and said disc only when said valve element is rotated towards its closed position, and spring means interposed between said member and the end of said stem maintaining said member and said disc in contact and said friction surfaces in mutual contact.

5. The valve of claim 4 in which the area of the surface of the member engaging the disc is substantially less than the area of the disc, and the means effecting the positive connection between the member and the disc comprises a spring-pressed element carried by the member engageable with the adjacent face of the disc and the disc has a series of recesses which the element enters.

6. The valve of claim 4 in which the means effecting the positive connection between the member and the disc comprises a spring-pressed latch carried by the member engageable with the adjacent face of the disc and the disc has a series of recesses which the latch enters, the recess entering portion of the latch being so tapered that when the valve element is turned into its unlocked position the disc and the member are not positively connected and when the valve element is turned towards its closed position, the latch engages in one of the recesses to positively connect the disc and the member.

PERLEY H. RYAN.

REFERENCES CITED

The following references are of record in the file of this patent:

UNITED STATES PATENTS

| Number | Name | Date |
| --- | --- | --- |
| 1,346,887 | Heald | July 20, 1920 |
| 1,673,207 | Sauser | June 12, 1928 |
| 2,079,054 | Fadasz | May 4, 1937 |